US008635268B1

(12) United States Patent
Otwell et al.

(10) Patent No.: US 8,635,268 B1
(45) Date of Patent: Jan. 21, 2014

(54) CONTENT NOTIFICATION

(75) Inventors: Andrew H. Otwell, Seattle, WA (US); Sachin Kaushik, Windsor (GB); Arjun Chittoor, Redmond, WA (US)

(73) Assignee: Amazon Technologies, Inc, Reno, NV (US)

( * ) Notice: Subject to any disclaimer, the term of this patent is extended or adjusted under 35 U.S.C. 154(b) by 255 days.

(21) Appl. No.: 13/006,182

(22) Filed: Jan. 13, 2011

(51) Int. Cl.
*G06F 15/16* (2006.01)

(52) U.S. Cl.
USPC .......................................... 709/203; 715/760

(58) Field of Classification Search
USPC ........................................................ 715/760
See application file for complete search history.

(56) References Cited

U.S. PATENT DOCUMENTS

| | | | | |
|---|---|---|---|---|
| 5,923,323 A * | 7/1999 | Chiu et al. | ..................... | 715/767 |
| 6,157,379 A * | 12/2000 | Singh | ........................... | 715/866 |
| 7,512,898 B2 * | 3/2009 | Jennings et al. | .............. | 715/822 |
| 7,735,019 B2 * | 6/2010 | Firebaugh et al. | ........... | 715/784 |
| 2010/0162126 A1 * | 6/2010 | Donaldson et al. | .......... | 715/738 |
| 2011/0161866 A1 * | 6/2011 | Rainisto | ........................ | 715/785 |
| 2011/0173534 A1 * | 7/2011 | Huang et al. | .................. | 715/702 |

OTHER PUBLICATIONS

Washington University in St. Louis. (Oct. 2008). Marketplace Purchase Requisition System Requisitioner User Guide. (81 pp.) Retrieved from https://aisinfo.wustl.edu/docs/Purchasing/MP%20Requisitoner%20Guide%20dec3.doc.*
Author Unknown; https://mail.google.com/mail/?shva=1#inbox/12b72ac9b986e8da; Gmail-Thanks for Contacting Us!—wedding.alias@gmail.com-Mozilla Firefox (Publication date unknown).

* cited by examiner

*Primary Examiner* — Aaron Strange
*Assistant Examiner* — Timothy Sowa
(74) *Attorney, Agent, or Firm* — Thomas | Horstemeyer, LLP

(57) ABSTRACT

Disclosed are various embodiments of systems and methods for content notification. For example, in some embodiments, a method includes the step of storing a network page in a memory in a client computing device. The network page includes a list of item representations associated with a plurality of items. Each item representation is associated with a respective one of the items. The method further includes the step of rendering the network page using the client computing device. The network page includes a content notification component in a visible portion, and the content notification component is visible in a viewport. The content notification component provides notification to a user of at least one non-visible portion of the network page.

20 Claims, 10 Drawing Sheets

CONTENT NOTIFICATION

BACKGROUND

An online merchant will sometimes provide a checkout page for a customer to review an order of products prior to purchasing the products. The products included in the order may be listed in the checkout page, but some of the products may not be visible to the customer. In some cases, a customer will purchase a product he did not intend to purchase because he did not realize the product was included in the order since the product was not visible.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the disclosure. Moreover, in the drawings, like reference numerals designate corresponding parts throughout the several views.

DETAILED DESCRIPTION

The present application describes various embodiments of systems and methods useful in electronic commerce for notifying a user of network page content that is not visible in a browser window (i.e, a viewport). For example, in some embodiments, a network page is encoded that includes a content notification component that alerts a user to content that the user may have to scroll up or down to see in the browser window. In some embodiments, the content notification component is a bar that provides links to the network page content that is not visible in the browser window. The content notification component may also be updated as the user scrolls up or down in the network page or resizes the browser window, for example. In the following discussion, a general description of the system and its components is provided, followed by a discussion of the operation of the same.

Figure 1:
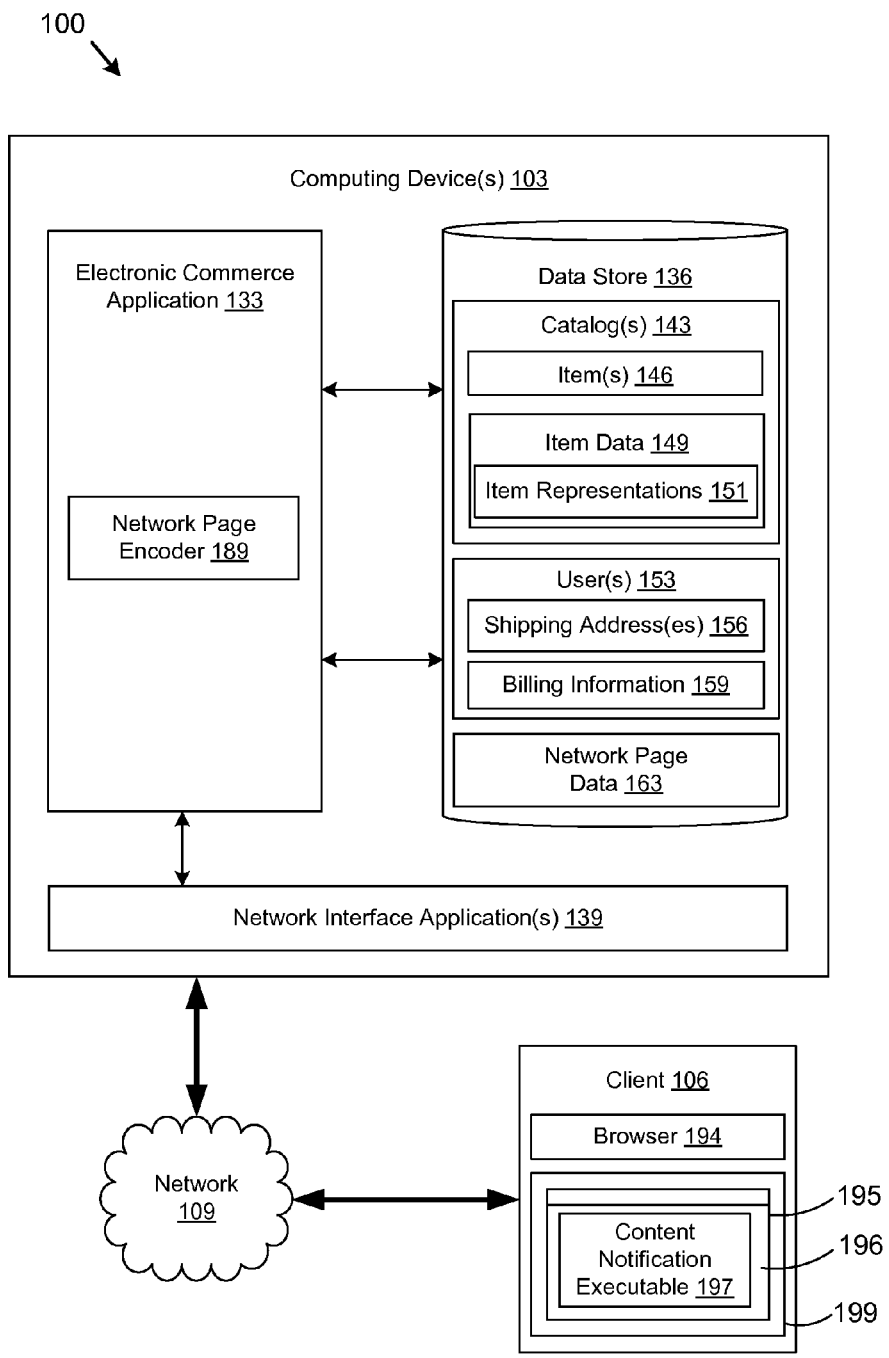
FIG. 1 is a drawing of a networked environment according to various embodiments of the present disclosure.

With reference to FIG. 1, shown is a networked environment 100 according to various embodiments. The networked environment 100 includes a computing device 103, a client 106, and a network 109. The network 109 includes, for example, the Internet, intranets, extranets, wide area networks (WANs), local area networks (LANs), wired networks, wireless networks, or other suitable networks, etc., or any combination of two or more such networks.

The computing device 103 may comprise, for example, a server computer or any other system providing computing capability. Alternatively, a plurality of computing devices 103 may be employed that are arranged, for example, in one or more server banks or computer banks or other arrangements. A plurality of computing devices 103 together may comprise, for example, a cloud computing resource, a grid computing resource, and/or any other distributed computing arrangement. Such computing devices 103 may be located in a single installation or may be dispersed among many different geographical locations. For purposes of convenience, the computing device 103 is referred to herein in the singular. Even though the computing device 103 is referred to in the singular, it is understood that a plurality of computing devices 103 may be employed in the various arrangements as described above.

Various applications and/or other functionality may be executed in the computing device 103 according to various embodiments. Also, various data is stored in a data store 136 that is accessible to the computing device 103. The data store 136 may be representative of a plurality of data stores as can be appreciated. The data stored in the data store 136, for example, is associated with the operation of the various applications and/or functional entities described below.

The components executed on the computing device 103, for example, include an electronic commerce application(s) 133, a network interface application(s) 139, and other applications, services, processes, systems, engines, or functionality not discussed in detail herein. The electronic commerce application 133 is executed in order to facilitate the online purchase of items 146 over the network 109. The electronic commerce application 133 also performs various backend functions associated with the online presence of a merchant in order to facilitate the online purchase of items 146, as will be described.

For example, the electronic commerce application 133 generates one or more network pages 196, using a network page encoder 189, such as web pages or other types of network content that are provided to client(s) 106 for the purposes of selecting items 146 for purchase, rental, download, lease, or other form of consumption, as will be described. The network page encoder 189 encodes network pages 196 for rendering on the client 106 in response to requests from the client 106.

In some embodiments, the electronic commerce application 133 also provides a checkout pipeline to facilitate the creation and submission of a purchase order including at least one item. For example, the checkout pipeline may include a series of network pages 196 regarding inputting a shipping address 156, providing billing information 159, reviewing items 146 selected for purchase, inputting promotional codes (e.g., coupons, gift cards, etc), and/or other processes related to the creation and submission of a purchase order. In some embodiments, the checkout pipeline includes a network page 196 that is a checkout page for review by the user of the purchase order prior to a submission of the purchase order. The checkout page may include a list of item representations 151 associated with items 146 selected for purchase, a shipping address 156, billing information 159, and/or other information related to a purchase order.

The data stored in the data store 136 includes, for example, a catalog 143 of items 146 associated with item data 149. As used herein, the term "item" 146 may refer to a product, good, service, software download, multimedia download, social networking profile, or other item 146 that may be offered for sale, purchase, rental, lease, download, and/or any other form of consumption as may be appreciated. The various data stored in the item data 149 may include titles, descriptions, quantities, images, representations, options, weights, customer reviews, customer ratings, keywords, tags, shipping restrictions, tax classifications, categories, unique identifiers, and any other data related to items 146.

Also, the data store 136 stores information regarding users 153 such as shipping addresses 156 and billing information 159. Other information regarding the users 153 may be stored in the data store 136 such as a view history, a purchase history, preferences, a registry, a wish list, an email address, profile data, payment information, and other data related to a user 153. Additionally, the data store 136 stores network page data 163. The network page data 163 includes data used in generating network pages 196. Such data may include an order summary, templates, graphics, text, client-side code, style sheets, and so on.

The client 106 is representative of a plurality of client devices that may be coupled to the network 109. The client 106 may comprise, for example, a processor-based system such as a computer system. Such a computer system may be embodied in the form of a desktop computer, a laptop computer, a personal digital assistant, a cellular telephone, a set-top box, a music player, a web pad, a tablet computer system, a game console, an electronic book reader, or other devices with like capability.

The client 106 may be configured to execute various applications such as a browser 194 and/or other client side applications. The browser 194 or another client side application may be executed in a client 106, for example, to access and render network pages 196, such as web pages, or other network content served up by the computing device 103 and/or other servers. The client 106 may be configured to execute applications beyond a browser 194 such as, for example, an email application, an instant message application, and/or other applications.

When executed in a client 106, the browser 194 renders network pages 196 on a respective display device 199 and may perform other functions. A visible portion of a network page 196 is displayed in a viewport 195 on the respective display device 199. The browser 194 accesses network pages 196, such as web pages or other types of content from the computing device 103 in order to access the functionality of the content notification application 183 and other components implemented in the computing device 103, as will be described.

A network page 196 may include code that generates dynamic content when executed or interpreted in the client 106. The code may be written in any suitable programming language, such as PHP, Perl, Objective C, Java, Ruby, etc. Also, the network page data 163 may include code regarding static content, for example, in hypertext markup language (HTML), extensible markup language (XML), and/or any other language suitable for creating network pages 196. Further, the network pages 196 include a content notification executable 197 obtained from the electronic commerce application(s) 133, which may comprise client-side code to be interpreted or executed within the browser 194 on the client 106. The content notification executable 197 may include dynamic HTML (DHTML), Flash, VB Script, Java Script, Java, Ajax, ActiveX, and/or any other client-side code.

Referring next to FIGS. 2-7, examples of network pages 196 (FIG. 1) generated in association with the operation of the network page encoder 189 (FIG. 1) are described. It is understood that the network pages 196 shown in FIGS. 2-7 are merely examples of the many different network pages 196 that may be generated to accomplish the various purposes discussed. To this end, the features included in the network pages 196 are presented herein as examples, whereas other types of features may be employed instead to accomplish the same underlying purposes. Further, the various features may be manipulated using various input devices such as a keyboard, a mouse, a microphone, and other devices as can be appreciated.

A network page 196 is rendered on a display device 199 (FIG. 1) of a client 106 (FIG. 1). Information stored in a data store 136 (FIG. 1) on a computing device 103 (FIG. 1) may be presented to a user in the network page 196 communicated by the network interface application 139 (FIG. 1) over the network 109 (FIG. 1) to the client 106. Also, the network page 196 provides one example of the many different network pages 196 that may be created for different types of display devices 199 employed on a respective client 106. For example, a network page 196 may be formatted differently to fit on a small display screen of a personal digital assistant or other mobile device, etc. Additionally, different graphical user interface (GUI) components may be used.

Figure 4:
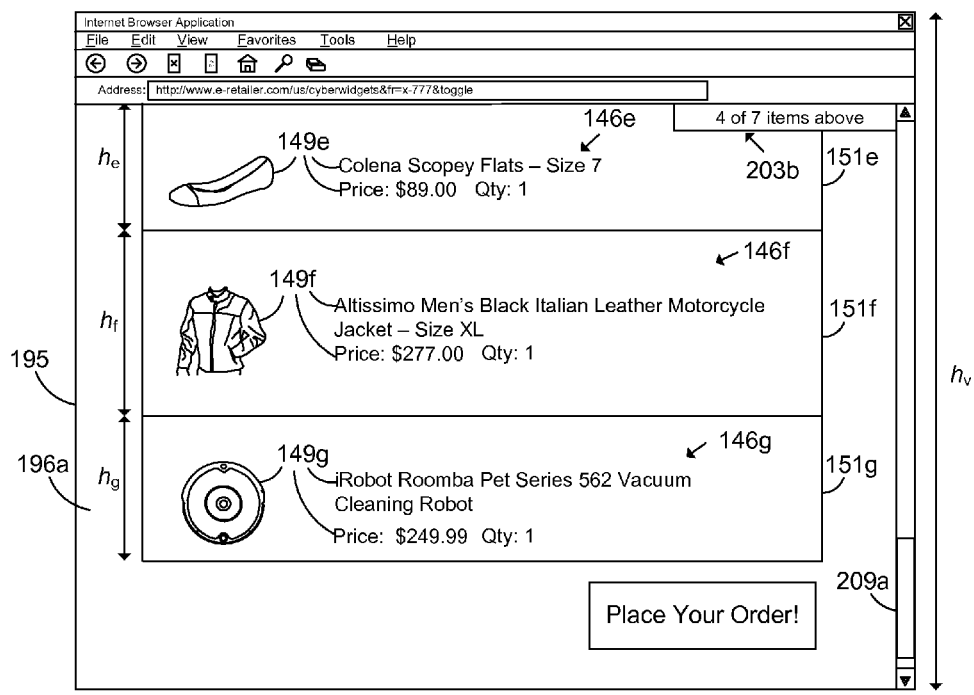
Figure 5:
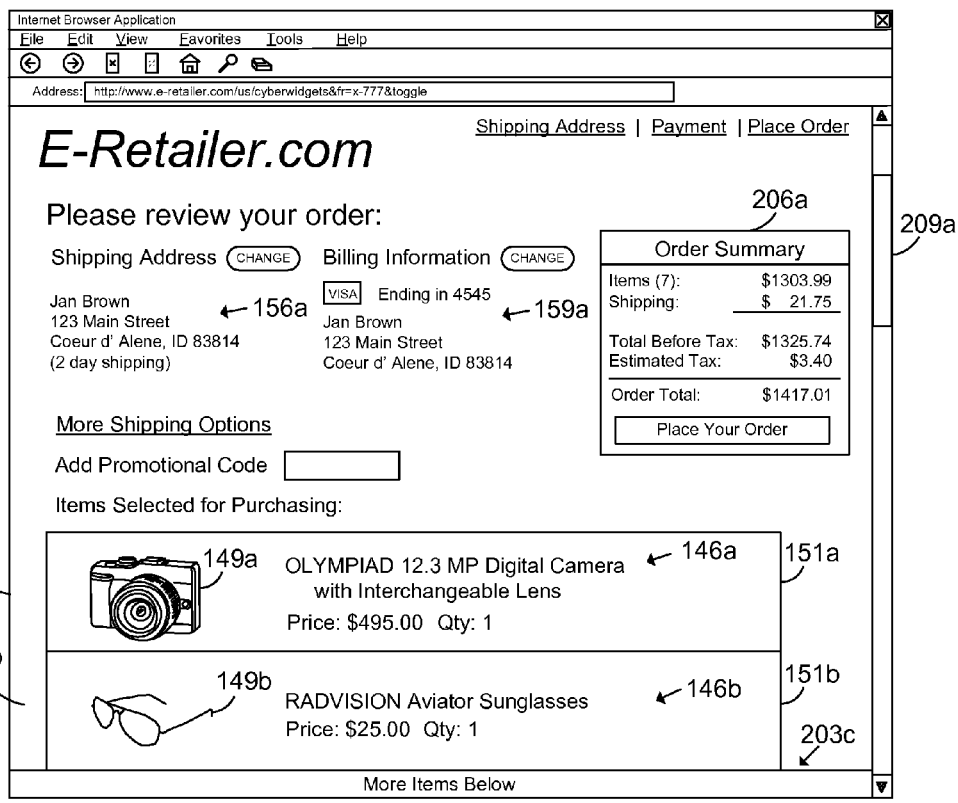
Figure 6:
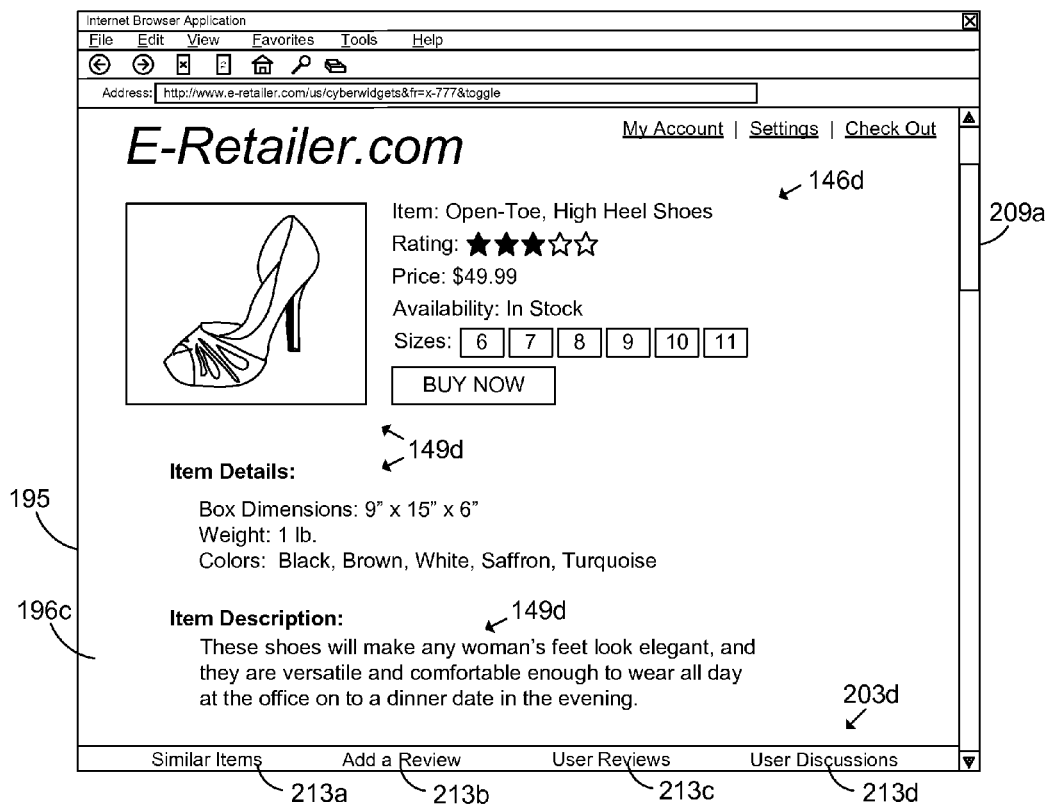
Figure 7:
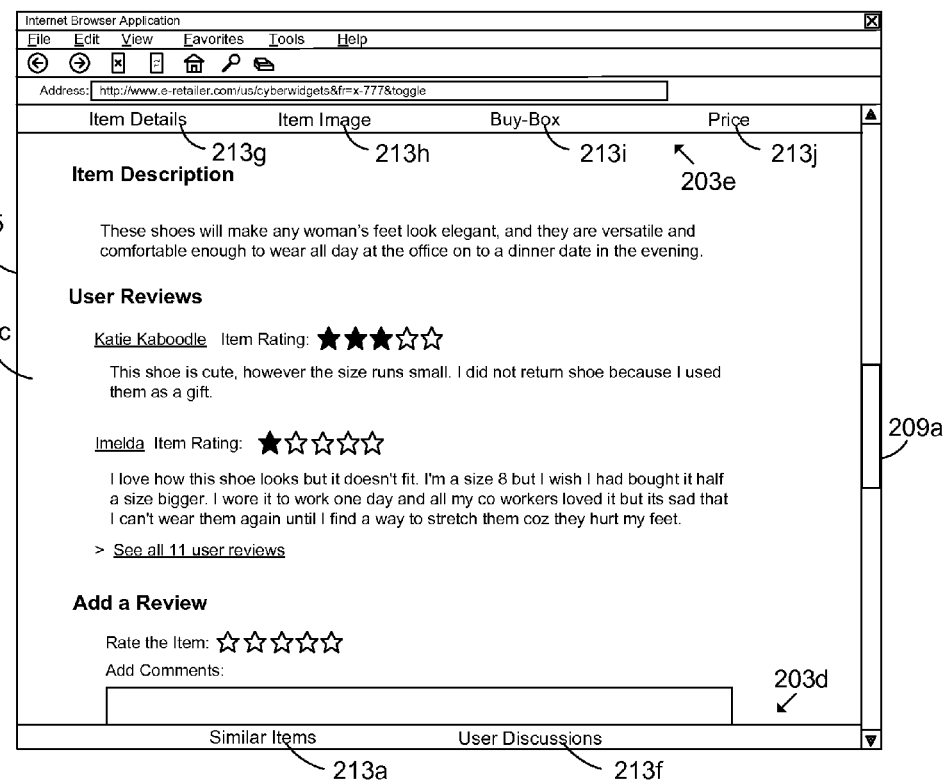

FIGS. 2-7 illustrate examples of a network page 196 (FIG. 1), denoted herein as 196a, 196b, and 196c, rendered by a client 106 (FIG. 1) in the networked environment 100 of FIG. 1 according to various embodiments of the present disclosure. The network pages 196 are each generated in association with the operation of the network page encoder 189 (FIG. 1). FIGS. 2-5 illustrate network pages 196a and 196b that are examples of a checkout page. Further, FIGS. 6-7 illustrate a network page 196c that is an example of an item detail page associated with an example of an item 146 (FIG. 1), denoted herein as 146d. The network pages 196a, 196b, and 196c are each associated with an online merchant (e.g., E-Retailer).

Figure 2:
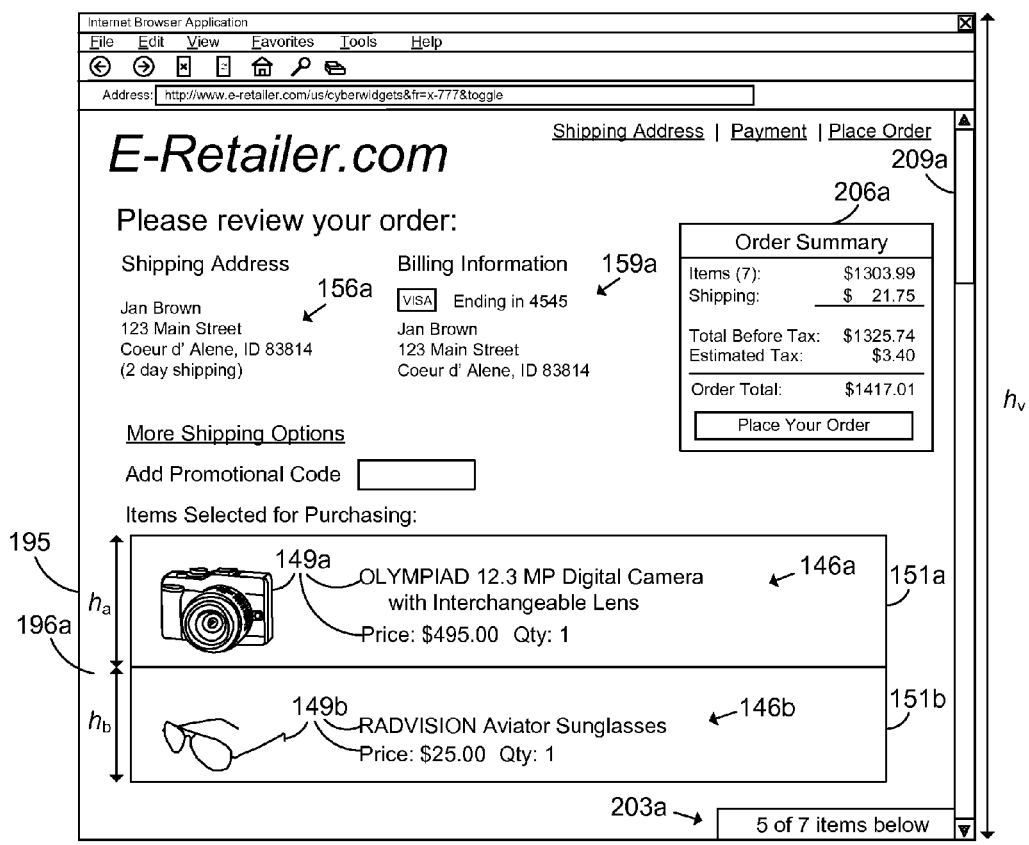
FIGS. 2-7 are drawings of examples of network pages rendered by a client in the networked environment of FIG. 1 according to various embodiments of the present disclosure.

Referring to FIG. 2, shown is a visible portion of a rendered network page 196a in a viewport 195 of a browser 194. As stated above, the network page 196a is a checkout page that provides a summary of a purchase order prior to the submission of the purchase order to the online merchant (e.g., E-Retailer) associated with the network page 196a. In this example, the checkout page includes an example of a shipping address 156, denoted herein as 156a, and an example of billing information 159, denoted herein as 159a, associated with a user 153. The checkout page also includes an example of an order summary 206, denoted herein as 206a, that includes shipping costs, tax, and an order total, for example.

Additionally, the network page 196a includes a list of seven items 146, denoted herein as 146a, 146b, 146c, 146d, 146e, 146f, 146g, which are included in the purchase order associated with the user. The network page 196a also includes examples of item representations 151, denoted herein as 151a, 151b, 151c, 151d, 151e, 151f, 151g, including item data 149, denoted herein as 149a, 149b, 149c, 149d, 149e, 149f, 149g. The item data 149 includes, for example, item images, the item name, and an item price.

In this example, the visible portion of the network page 196a included in the viewport 195 shown in FIG. 2 only includes two items 146 (i.e., 146a, 146b). The network page 196a also includes an example of a content notification component 203, denoted herein as 203a, that notifies a user of content included in a non-visible portion of the network page 196a that is not visible in the viewport 195 in FIG. 2. In this example, the content notification component 203a indicates that five of seven items 146 are located in a non-visible portion of the network page 196a, and this non-visible portion is a portion of the network page 196a that is located below the visible portion shown in the viewport 195 in FIG. 2.

Figure 3:
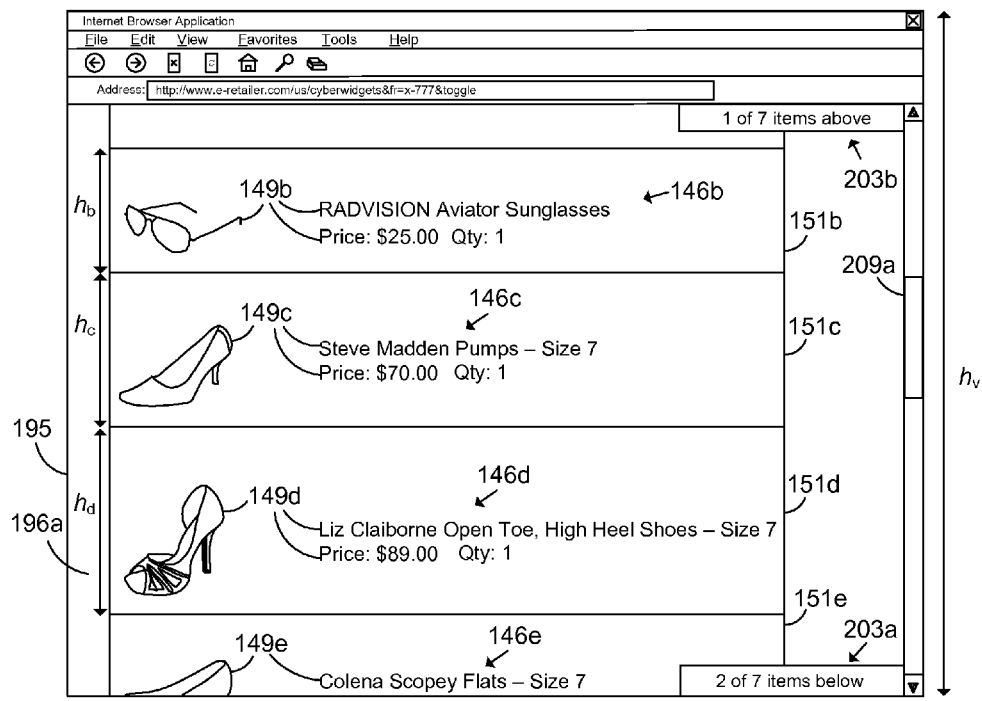

Moving to FIG. 3, shown is another visible portion of the network page 196a (FIG. 2). In this example, a scroll bar 209, denoted herein as 209a, has been moved from the top of the viewport 195, as shown in FIG. 2, to the middle of the viewport 195, as shown in FIG. 3. The visible portion of the network page 196a in the viewport 195 in FIG. 3 includes some of the content of the network page 196a that is also visible in the viewport 195 in FIG. 2. For example, the visible portions illustrated in FIGS. 2 and 3 both include item 146b (e.g., the sunglasses). However, item 146a (e.g., the camera) is not included in the visible portion illustrated in FIG. 3.

FIG. 3 includes two examples of a content notification component 203, denoted herein as 203a and 203b. In the viewport 195 illustrated in FIG. 3, the content notification component 203a is located at the bottom of the viewport 195, and the content notification component 203b is located at the top of the viewport 195. The content notification component 203b notifies the user that one of seven items 146 is included in a non-visible portion of the network page 196a that is above the visible portion in the viewport 195. In this example, the content notification component 203b is referring to item 146a (e.g., the camera) as the one item 146 included in the non-visible portion above the visible portion of the network page 196a.

Additionally, similar to visible portion illustrated in FIG. 2, the visible portion illustrated in FIG. 3 includes the content notification component 203a. In this example, the content notification component 203a indicates that two of seven items 146 are located in a non-visible portion of the network page 196a, and this non-visible portion is a portion of the network page 196a that is located below the visible portion shown in the viewport 195 in FIG. 3. In FIG. 3, the content notification component 203a has been updated based at least in part on a scroll event of the scroll bar 209a being moved from the top of the viewport 195 in FIG. 2 to the middle of the viewport 195 in FIG. 3.

Referring next to FIG. 4, shown is yet another visible portion of the network page 196a (FIGS. 2, 3). In this example, the scroll bar 209a has been moved from the middle of the viewport 195, as shown in FIG. 3, to the bottom of the viewport 195, as shown in FIG. 4. The visible portion of the network page 196a in the viewport 195 in FIG. 4 includes some of the content of the network page 196a that is also visible in the viewport 195 in FIG. 3. For example, the visible portions illustrated in FIGS. 3 and 4 both include item 146e (e.g., the flats). However, items 146a, 146b, 146c, 146d, which are illustrated in FIGS. 2 and/or 3, are not included in the visible portion in the viewport 195 illustrated in FIG. 4.

Additionally, similar to visible portion illustrated in FIG. 3, the visible portion illustrated in FIG. 4 includes the content notification component 203b. In this example, the content notification component 203b indicates that four of seven items 146 (e.g., 146a, 146b, 146c, 146d) are located in a non-visible portion of the network page 196a, and this non-visible portion is a portion of the network page 196a that is located above the visible portion shown in the viewport 195 in FIG. 4. In FIG. 4, the content notification component 203b has been updated based at least in part on a scroll event of the scroll bar 209a being moved from the middle of the viewport 195 in FIG. 3 to the bottom of the viewport 195 in FIG. 4. The content notification component 203a is not included in the visible portion in the viewport 195 in FIG. 4 because there is not a non-visible portion of the network page 196a located below the visible portion in the viewport 195.

Referring to FIG. 5, shown is a visible portion of a rendered network page 196b in a viewport 195 of a browser 194 (FIG. 1). The visible portion of the rendered network page 196b illustrated in FIG. 5 is similar to the visible portion of the rendered network page 196a of FIG. 2. However, the network page 196b includes another example of a content notification component 203, denoted herein as 203c, which is a bar located at the bottom of the viewport 195. In this example, content notification component 203c generally indicates that more items 146 that are included in the network page 196b are located in a non-visible portion, and the non-visible portion of the network page 196b is located below the visible portion in the viewport 195.

Turning to FIG. 6, shown is a visible portion of a rendered network page 196c in a viewport 195 of a browser 194 (FIG. 1), and the visible portion includes another example of a content notification component 203, denoted herein as 203d. The network page 196c is an item detail page regarding the item 146d, and the visible portion of the network page 196c shown in the viewport 195 includes item data 149d such as, for example, an item image, item details, and an item description.

The network page 196c also includes other item data 149d such as, for example, recommendations of items 146 similar to the item 146d, user reviews of the item 146d, and user discussions regarding the item 146d. Additionally, the network page 196c includes a component for adding a review. However, recommendations of items 146 similar to the item 146d, user reviews of the item 146d, user discussions regarding the item 146d, and component for adding a review are not included in the visible portion of the network page 196 in the viewport 195 illustrated in FIG. 6. The content notification component 203d included in the visible portion illustrated in FIG. 6 is a bar located at the bottom of the viewport 195 that provides examples of links 213, denoted herein as 213a, 213b, 213c, and 213d, to the item data 149d and components that are included in the non-visible portion of the network page 196c.

Moving now to FIG. 7, shown is another visible portion of the rendered network page 196c (FIG. 6) in the viewport 195 of the browser 194 (FIG. 1). In this example, the scroll bar 209a has been moved from the top of the viewport 195, as shown in FIG. 6, to the middle of the viewport 195, as shown in FIG. 7. The visible portion of the network page 196c in the viewport 195 in FIG. 7 includes some of the content of the network page 196c that is also visible in the viewport 195 in FIG. 6. For example, the visible portions illustrated in FIGS. 6 and 7 both include the item description regarding the item 146d.

The visible portion illustrated in FIG. 7 includes the content notification component 203d (FIG. 6) as well as another example of a content notification component 203, denoted herein as 203e. In FIG. 7, the content notification component 203d has been updated based at least in part on a scroll event of the scroll bar 209a being moved from the top of the viewport 195 in FIG. 6 to the middle of the viewport 195 in FIG. 7. Since the user reviews and add a review component are included in the visible portion in the viewport 195, the content notification component 203d is updated and no longer includes links 213b, 213c. The content notification component 203e, which is located at the top of the viewport 195, provides links 213 to content included in a non-visible portion of the network page 196c located above the visible portion included in the viewport 195. For example, the links 213, denoted herein as 213g, 213h, 213i, and 213j, link to item data 149d and other components such as item details, an item image, a buy-box, and an item price associated with the item 146d.

Figure 8:
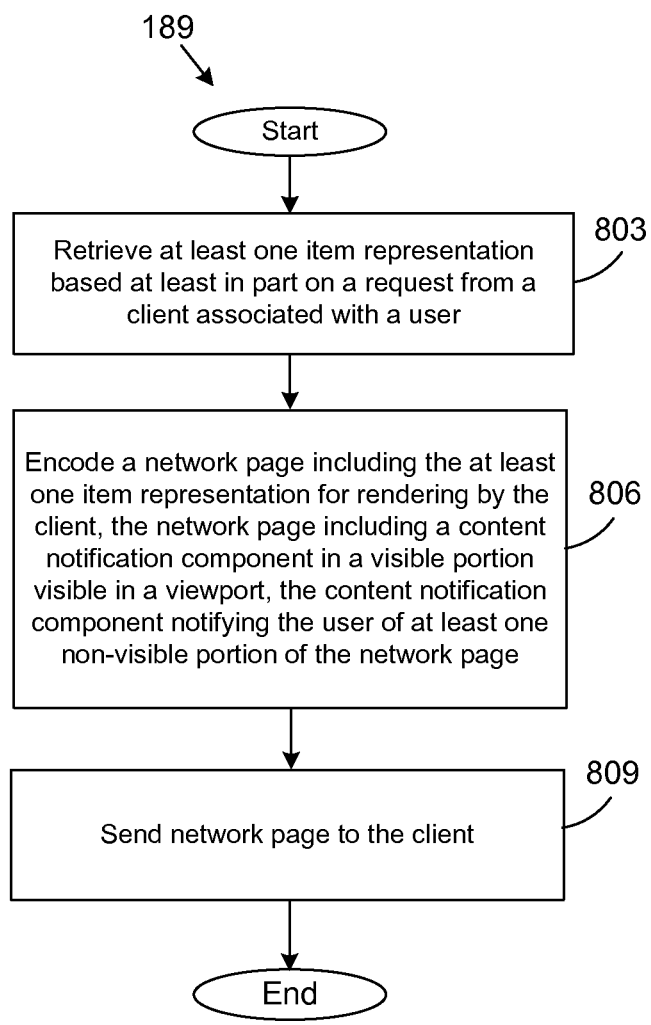
FIG. 8 is a flowchart illustrating one example of functionality implemented as portions of a network page encoder executed in a computing device in the networked environment of FIG. 1 according to various embodiments of the present disclosure.

Referring next to FIG. 8, shown is a flowchart that provides an example of the operation of a portion of the network page encoder 189 (FIG. 1) according to various embodiments. It is understood that the flowchart of FIG. 8 provides merely an example of the many different types of functional arrangements that may be employed to implement the operation of the portion of the content notification application 183 as described herein. As an alternative, the flowchart of FIG. 8 may be viewed as depicting an example of steps of a method implemented in the computing device 103 (FIG. 1) according to one or more embodiments.

Next, FIG. 8 will be discussed below in connection with FIGS. 2-7, which illustrate examples of a network page 196 (FIG. 1) according to various embodiments of the present disclosure. Beginning with box 803 in FIG. 8, the computing device 103 retrieves at least one item 146 based at least in part on a request from a client 106 associated with a user 153. In some embodiments, this item 146 may be selected from a plurality of search results related to a search query. Alternatively, this item 146 may be selected for purchasing by the user 153.

In box 806, the computing device 103 encodes a network page 196 for rendering by the client 106. The network page 196 includes the at least one item 146 retrieved in box 803. The network page 196 further includes a content notification component 203 in a visible portion of the network page 196 that is visible in a viewport 195. The content notification component 203 notifies the user of at least one non-visible portion of the network page 196. In box 813, the computing device 103 sends the network page 196 to the client 106, and the client 106 is associated with the user 153.

For example, referring to FIGS. 2-5, shown are examples of visible portions in a viewport 195 of a rendered network page 196*a*, which is a checkout page. Each visible portion includes a content notification component 203 that notifies the user 153 of content that is included in a non-visible portion of the network page 196*a*. In FIG. 2, the content notification component 203*a* notifies the user that five of seven items 146 are included in a non-visible portion of the network page 196*a*, and those five items 146 are located in the network page 196*a* below the visible portion shown in the viewport 195. In FIG. 5, the visible portion includes a content notification component 203*c* that is a bar that generally notifies the user that other items 146 are located in the network page 196*a* below the visible portion shown in the viewport 195.

Additionally, in FIG. 3, the visible portion in the viewport 195 is a middle portion of the network page 196*a*, and the visible portion includes two content notification components 203*a*, 203*b*. The content notification component 203*a* indicates that two of seven items 146 are located in portion of the network page 196*a* that is located below the visible portion in the viewport 195. Similarly, content notification component 203*b* indicates that one of seven items 146 are located in portion of the network page 196*a* that is located above the visible portion in the viewport 195. Further, in FIG. 4, the visible portion in the viewport 195 is a bottom portion of the network page 196*a*, and the visible portion includes the content notification component 203*b*, which notifies the user that four of seven items 146 are located in portion of the network page 196*a* that is located above the visible portion in the viewport 195.

As another example, referring to FIGS. 6-7, shown are examples of visible portions in a viewport 195 of a rendered network page 196*c*, which is an item detail page. The visible portion shown in the viewport 195 in FIG. 6 is an item detail page regarding item 146*d* and includes item data 149*d* and components associated with the item 146*d*. In FIG. 6, the visible portion includes the content notification component 203*d*, which is a bar located at the bottom of the viewport 195. The content notification component 203*d* that provides links 213*a*, 213*b*, 213*c*, 213*d* to the item data 149*d* and components that are included in the non-visible portion of the network page 196*c*. Similarly, in FIG. 7, the visible portion includes the content notification components 203*d*, 203*e*, which are bars located, respectively, at the bottom and top of the viewport 195. The content notification components 203*d* provide links 213*a*, 213*f*, 213*g*, 213*h*, 213*i*, 213*j* to the item data 149*d* and components that are included in the non-visible portion of the network page 196*c*.

Figure 9:
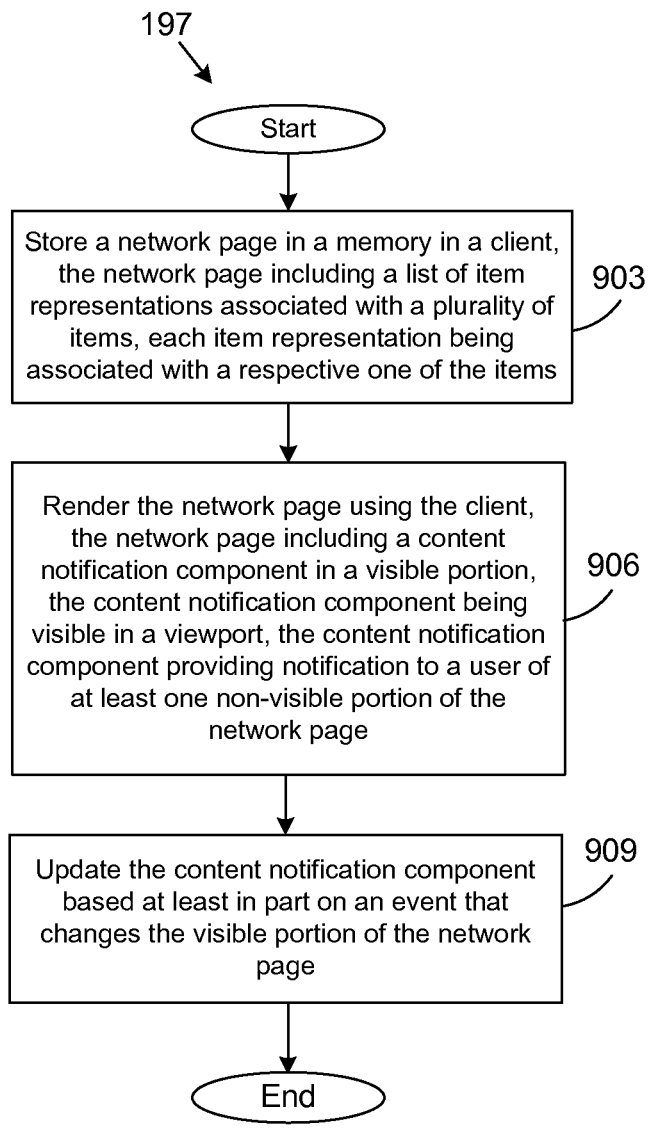
FIG. 9 is a flowchart illustrating one example of functionality implemented as portions of a content notification executable executed in a client in the networked environment of FIG. 1 according to various embodiments of the present disclosure.

Referring to FIG. 9, shown is a flowchart that provides an example of the operation of a portion of the content notification executable 197 (FIG. 1) according to various embodiments. It is understood that the flowchart of FIG. 9 provides merely an example of the many different types of functional arrangements that may be employed to implement the operation of the portion of the content notification executable 197 as described herein. As an alternative, the flowchart of FIG. 9 may be viewed as depicting an example of steps of a method implemented in the computing device 103 (FIG. 1) according to one or more embodiments.

Next, FIG. 9 will be discussed below in connection with FIGS. 2-7, which illustrate examples of a network page 196 (FIG. 1) according to various embodiments of the present disclosure. Beginning with box 903 in FIG. 9, the client 106 stores a network page 196 in a memory. The network page 196 includes a list of items 146. In box 906, the client 106 renders the network page 196 using the browser 194. The network page 196 includes a content notification component 203 in a visible portion. In some embodiments, the network page 196 may include more than one content notification component 203. The content notification component 203 is visible in a viewport 195 and provides notification to a user of at least one non-visible portion of the network page 196.

In box 909, the client 106 updates the content notification component 203 based at least in part on an event that changes the visible portion of the network page 196. Examples of events that change the visible portion of the network page 196 include scroll events, an orientation change event, a content addition event, a content subtraction event, a page resize event, a viewport resize event, and/or another event that alters the portion of the network page 196 that is shown in the viewport 195. For example, in some embodiments, the event may be a scroll event where the position of a scroll bar 209 is altered to change the portion of the network page 196 that is visible in the viewport 195. In other embodiments, the event may be an orientation change event that includes changing the orientation of the viewport 195 from a portrait orientation to a landscape orientation. Such an orientation change event may occur, for example, in a client 106 that is a mobile device, such as a smart phone, for example.

Another example of an event is a content addition event that includes adding content to a network page 196. In a content addition event, the viewport 195 remains a constant size, but content is added to the visible portion of the network page 196, which causes other content in the visible portion to be moved to the non-visible portion of the network page 196. For example, a user may select to edit a shipping address 156 in the checkout page, and additional fields for adding a new shipping address 156 may be added to the network page 196, which pushes an item representation 151 into a non-visible portion of the network page 196. Another example of an event is a content subtraction event that includes subtracting content from a network page 196. For example, a user may delete an item 146 from the purchase order, which results in content being included in the visible portion of the network page 196 that was previously included in a non-visible portion of the network page 196.

A further example of an event is a page resize event. For example, a user may zoom into a network page 196, which increases the font of the text in the network page 196, causing some of the content that was previously visible to be non-visible. Similarly, a viewport resize event may also change the visible portion of the network page 196 to include content that was previously non-visible or to exclude content that was previously visible.

In some embodiments, the content notification component 203 may fade in and out of a network page 196 responsive to one of the events discussed above. For example, if an event causes the entire network page 196 to be visible in the viewport 195, the content notification component 203 is no longer useful and will fade from the network page 196. In some embodiments, if the content notification component 203 was previously not shown in the network page 196, the content notification component 203 may fade into view responsive to an event that causes content of the network page 196 to be included in a non-visible portion. In some embodiments, the content notification component 203 may flash to attract the attention of a user.

In some embodiments, the content notification component 203 includes a counter based at least in part on a number of item representations 151. For example, referring to FIG. 2, shown is an example of a content notification component 203 that includes a counter. In FIG. 2, the content notification component 203a includes a counter that indicates that five of seven items 146 are included below the visible portion. The counter shows a count of the number of item representations 151 that are included in a non-visible portion of the network page 196 as well as a count of the number of item representations 151 included in the network page 196.

In some embodiments, the client 106 also determines whether the last item representation 151 in the list of item representations 151 is included in the visible portion of the network page 196. Also, responsive to a determination that the last item representation 151 is not included in the visible portion, the content notification component 203 is updated in the visible portion to notify the user that the non-visible portion of the network page 196 includes at least one of the item representations 151.

Further, in some embodiments, the client 106 may calculate the number of item representations 151 included in a visible portion of the network page 196 as well as the number of item representations 151 included in one or more non-visible portions of the network page 196. These numbers may be calculated responsive to an event that changes the visible portion of the network page 196, and at least one content notification component 203 may be updated accordingly. For example, the client 106 may determine a scroll position associated with the network page 196 and determine a plurality of heights h associated with the item representations 151 included in a list in the network page 196. Each height h is associated with a respective one of the item representations 151. For example, referring to FIGS. 2-5, each item representation 151a, 151b, 151c, 151d, 151e, 151f, 151g, is associated with a respective height $h_a$, $h_b$, $h_c$, $h_d$, $h_e$, $h_f$, $h_g$. The height h of the item representation 151 may depend on the size of the item data 149 included in the item representation 151.

Further, the client 106 may sum the heights h associated with the item representations 151 to calculate a list height associated with the list of item representations 151. Further, the client 106 may determine a viewport height $h_v$, and in some cases, the list height may be greater than the viewport height $h_v$. Then, the client 106 may calculate the number of item representations 151 included in a visible portion of the network page 196 based at least in part on the scroll position, the list height, the viewport height $h_v$, and the height of other components and text included in the network page, such as an order summary 206, a shipping address 156, and billing information 159, for example.

Figure 10:
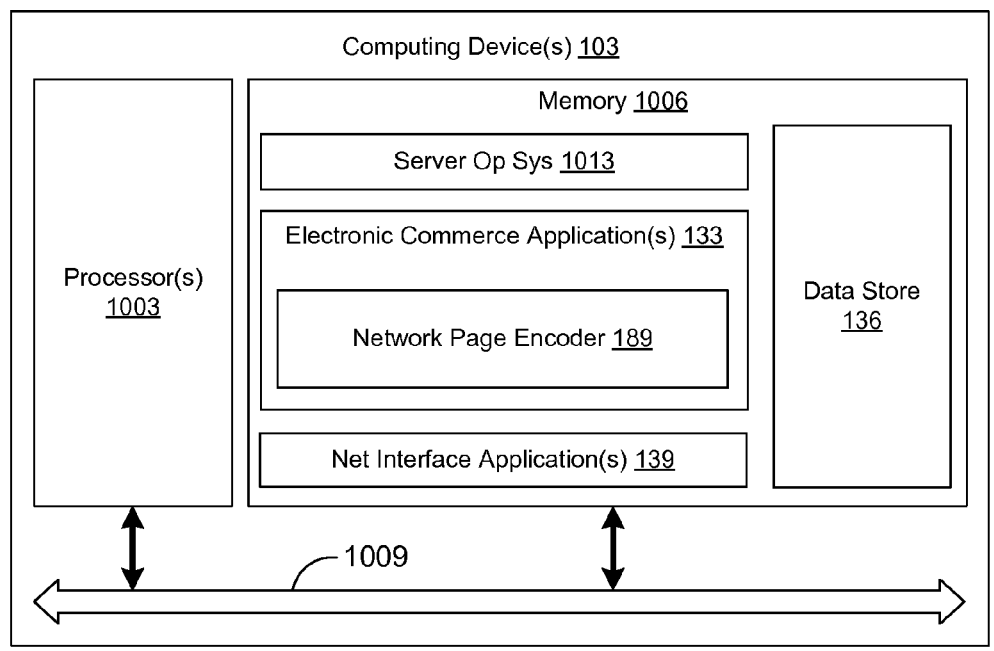
FIG. 10 is a schematic block diagram that provides one example illustration of a computing device employed in the networked environment of FIG. 1 according to various embodiments of the present disclosure.

With reference to FIG. 10, shown is a schematic block diagram of the computing device 103 according to an embodiment of the present disclosure. The computing device 103 includes at least one processor circuit, for example, having a processor 1003 and a memory 1006, both of which are coupled to a local interface 1009. To this end, the computing device 103 may comprise, for example, at least one server computer or like device. The local interface 1009 may comprise, for example, a data bus with an accompanying address/control bus or other bus structure as can be appreciated.

Stored in the memory 1006 are both data and several components that are executable by the processor 1003. In particular, stored in the memory 1006 and executable by the processor 1003 is at least one electronic commerce application 133, which includes a network page encoder 189, and potentially other applications. Also stored in the memory 1006 may be a data store 136 and other data. In addition, an operating system may be stored in the memory 1006 and executable by the processor 1003.

It is understood that there may be other applications that are stored in the memory 1006 and are executable by the processors 1003 as can be appreciated. Where any component discussed herein is implemented in the form of software, any one of a number of programming languages may be employed such as, for example, C, C++, C#, Objective C, Java, Javascript, Perl, PHP, Visual Basic, Python, Ruby, Delphi, Flash, or other programming languages.

A number of software components are stored in the memory 1006 and are executable by the processor 1003. In this respect, the term "executable" means a program file that is in a form that can ultimately be run by the processor 1003. Examples of executable programs may be, for example, a compiled program that can be translated into machine code in a format that can be loaded into a random access portion of the memory 1006 and run by the processor 1003, source code that may be expressed in proper format such as object code that is capable of being loaded into a random access portion of the memory 1006 and executed by the processor 1003, or source code that may be interpreted by another executable program to generate instructions in a random access portion of the memory 1006 to be executed by the processor 1003, etc. An executable program may be stored in any portion or component of the memory 1006 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 1006 is defined herein as including both volatile and nonvolatile memory and data storage components. Volatile components are those that do not retain data values upon loss of power. Nonvolatile components are those that retain data upon a loss of power. Thus, the memory 1006 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 1003 may represent multiple processors 1003 and the memory 1006 may represent multiple memories 1006 that operate in parallel processing circuits, respectively. In such a case, the local interface 1009 may be an appropriate network 109 (FIG. 1) that facilitates communication between any two of the multiple processors 1003, between any processor 1003 and any of the memories 1006, or between any two of the memories 1006, etc. The local interface 1009 may comprise additional systems designed to coordinate this communication, including, for example, performing load balancing. The processor 1003 may be of electrical or of some other available construction.

Although electronic commerce applications 133, a network page encoder 189, and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those skilled in the art and, consequently, are not described in detail herein.

The flowcharts of FIGS. 8 and 9 show the functionality and operation of an implementation of portions of the network page encoder 189 and the content notification executable 197, respectively. If embodied in software, each box may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 1003 in a computer system or other system. The machine code may be converted from the source code, etc. If embodied in hardware, each box may represent a circuit or a number of interconnected circuits to implement the specified logical function(s).

Although the flowcharts of FIGS. 8 and 9 show a specific order of execution, it is understood that the order of execution may differ from that which is depicted. For example, the order of execution of two or more boxes may be scrambled relative to the order shown. Also, two or more boxes shown in succession in FIGS. 8 and 9 may be executed concurrently or with partial concurrence. Further, in some embodiments, one or more of the boxes shown in FIGS. 8 and 9 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including electronic commerce applications 133, a network page encoder 189, a content notification executable 197, etc., that comprises software or code can be embodied in any non-transitory computer-readable medium for use by or in connection with an instruction execution system such as, for example, a processor 1003 in a computer system or other system. In this sense, the logic may comprise, for example, statements including instructions and declarations that can be fetched from the computer-readable medium and executed by the instruction execution system.

In the context of the present disclosure, a "computer-readable medium" can be any medium that can contain, store, or maintain the logic or application described herein for use by or in connection with the instruction execution system. The computer-readable medium can comprise any one of many physical media such as, for example, electronic, magnetic, optical, electromagnetic, infrared, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A non-transitory computer-readable medium embodying an electronic commerce program executable in a first computing device, the program comprising:
   code that retrieves a selection of at least two items for purchase from a second computing device associated with a user;
   code that retrieves a shipping address and billing information associated with the user; and
   code that encodes a checkout page for rendering by the second computing device, wherein the checkout page includes the shipping address and the billing information associated with the user, the checkout page further includes a plurality of items associated with the at least two items selected, and the checkout page further includes a bottom content notification component to notify the user of at least one of the items included in a bottom non-visible portion of the checkout page, wherein the bottom content notification component comprises at least a counter depicting a number of the items included in the bottom non-visible portion of the checkout page.

2. A system comprising:
   at least one computing device; and
   an electronic commerce application executable in the at least one computing device, the electronic commerce application comprising:
      logic that retrieves at least one item representation based at least in part on a request from another computing device, the at least one item representation being associated with at least one item for purchase; and logic that encodes a network page including the at least one item representation for rendering by the another computing device, wherein the network page is a checkout page in a checkout pipeline, wherein the network page includes a content notification component in a visible portion of the network page visible in a viewport, the content notification component providing a counter depicting a number of the at least one item representation included in at least one non-visible portion of the network page.

3. The system of claim 2, wherein the content notification component is a bar.

4. The system of claim 3, wherein the content notification component includes a link to the at least one non-visible portion of the network page.

5. The system of claim 2, wherein the content notification component is updated responsive to an event that changes the visible portion of the network page.

6. The system of claim 5, wherein the event is at least one of a scroll event, an orientation change event, a content addition event, a content subtraction event, a page resize event, and a viewport resize event.

7. The system of claim 5, wherein the content notification component is animated.

8. The system of claim 2, wherein the content notification component is a top content notification component to notify a user of at least one item representation included in a top non-visible portion of the network page.

9. The system of claim 8, wherein the network page further includes a bottom content notification component to notify the user of at least one item representation included in a bottom non-visible portion of the network page.

10. The system of claim 9, wherein the electronic commerce application further comprises logic that updates the bottom content notification component responsive to a scroll event.

11. A method comprising:
storing a network page in a memory in a computing device, wherein the network page includes a list of item representations associated with a plurality of items for purchase, wherein each item representation is associated with a respective one of the items, wherein the network page is a checkout page in a checkout pipeline; and
rendering the network page using the computing device, wherein the network page includes a content notification component in a visible portion, the content notification component being visible in a viewport, the content notification component providing a counter depicting a number of the item representations included in at least one non-visible portion of the network page.

12. The method of claim 11, wherein the at least one non-visible portion of the network page includes at least one of the item representations.

13. The method of claim 11, the method further comprising:
determining whether a last item representation in the list is included in the visible portion of the network page; and
responsive to a determination that the last item representation is not included in the visible portion, notifying a user that the non-visible portion includes at least one of the item representations.

14. The method of claim 11, further comprising:
determining a scroll position associated with the network page;
determining a plurality of heights associated with the item representations, wherein each height is associated with a respective one of the item representations; and
summing the heights to calculate a list height associated with the list of the item representations.

15. The method of claim 11, further comprising determining a viewport height responsive to an event that changes a rendered portion of the network page.

16. The method of claim 11, wherein the network page includes a top non-visible portion of the network page and a bottom non-visible portion of the network page, the method further comprising calculating a number of the item representations included in the bottom non-visible portion of the network page based at least in part on a scroll position, a list height, and a viewport height.

17. The method of claim 11, further comprising updating the content notification component based at least in part on a number of the item representations included in the visible portion of the network page.

18. The method of claim 11, wherein the content notification component is a top content notification component to notify a user of at least one of the item representations included in a top non-visible portion of the network page.

19. The method of claim 11, wherein the content notification component is a bottom content notification component to notify a user of at least one of the item representations included in a bottom non-visible portion of the network page, and the method further comprises updating the bottom content notification component responsive to a scroll event.

20. A system comprising:
a data store configured to store item data; and
a first computing device in communication with the data store, the first computing device configured to at least:
retrieve an item representation based at least in part on a request from a second computing device, the item representation being associated with an item for purchase; and
encode a network page including the item representation for rendering by the second computing device, wherein the network page is a checkout page from which a purchase of the item associated with the item representation may be initiated, wherein the network page includes a content notification component in a visible portion of the network page, the content notification component providing a notification to a user of a non-visible portion of the network page and comprising a counter depicting a number of item representations included in the non-visible portion of the network page, wherein the number of item representations is calculated based at least in part on a scroll position, a list height, and a viewport height.

* * * * *